Jan. 19, 1965   H. R. OTTO, JR   3,166,498
OIL FILTER WITH CHECK VALVE
Original Filed Feb. 19, 1960
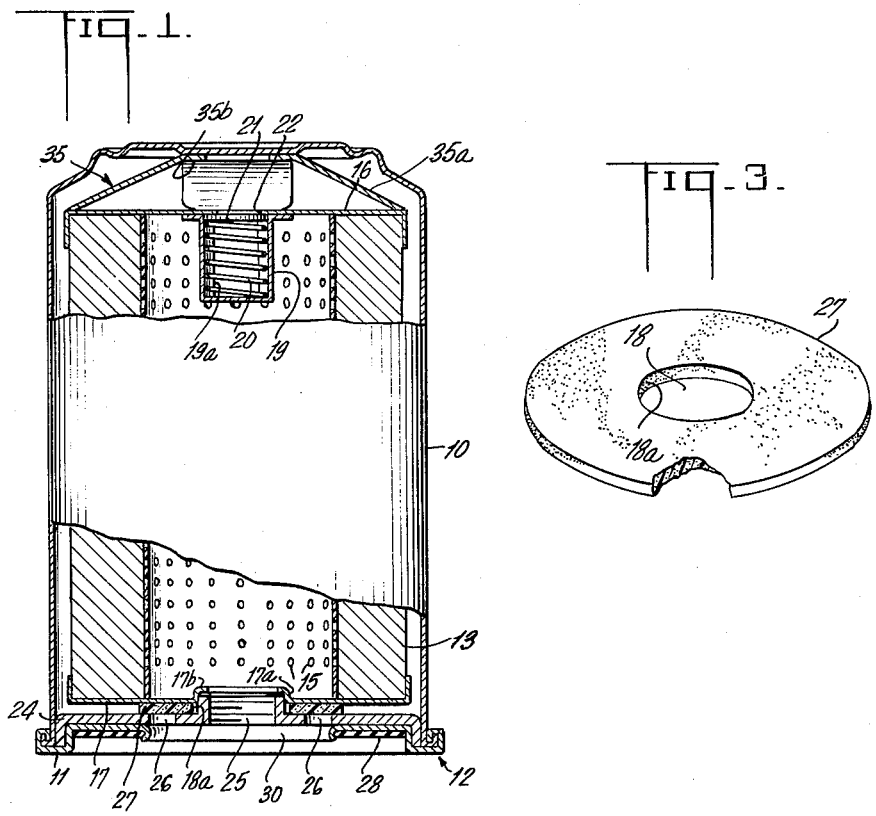
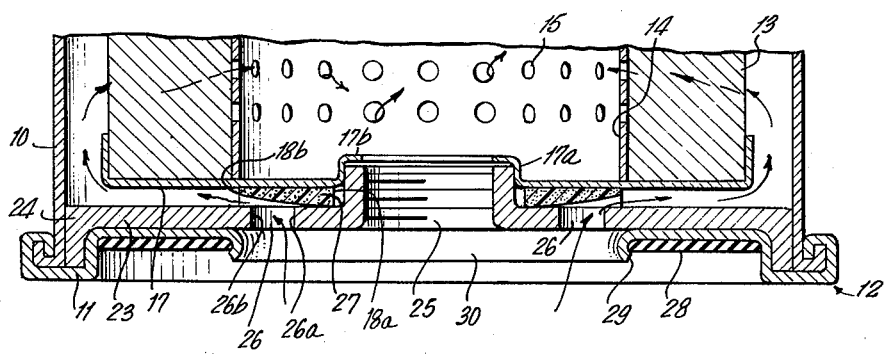
INVENTOR.
HERBERT R. OTTO, JR.
BY Charles Marks
ATTORNEY

3,166,498
OIL FILTER WITH CHECK VALVE
Herbert R. Otto, Jr., 4 Dickson Drive, Westfield, N.J.
Continuation of application Ser. No. 9,849, Feb. 19, 1960. This application Oct. 2, 1962, Ser. No. 228,782
1 Claim. (Cl. 210—130)

The present application is a continuation of applicant's prior application Serial No. 9,849, filed February 19, 1960, and now abandoned.

This invention relates generally to an improvement in oil filters of the throw-away type wherein the filter cartridge is permanently secured inside the filter shell, and more particularly to an improvement in throw-away type oil filters used in conjunction with automotive or other kinds of engines.

In the throw-away type of oil filter, as commonly used, a filter cartridge comprising a filter medium such as an annularly disposed, pleated filter paper, is received within a filter shell permanently sealed by a suitable end closure. The end closure is frequently provided with a series of apertures whereby oil to be filtered may be introduced within the filter shell and allowed to flow into the vicinity of the aforesaid filter paper. Since the oil is usually introduced into the filter shell under pressure, it may be forced through the filter paper into an outlet passage which leads back to the engine. In this manner, filtration of the oil may be quickly and easily accomplished.

When the filter paper becomes clogged due to excessive use, an alternative route to the outlet passage may be provided. However, since use of this alternative permits the return to the engine of oil which has not flown through the filter paper, the entire unit at this time may be considered of no use for filtering purposes and, accordingly, it may be discarded so as to permit replacement by a new filter.

During the useful life of the filter paper within any of the throw-away type oil filters, it is also highly undesirable to permit unfiltered oil to return to the engine either by way of drainback through the aforesaid apertures through which the oil is introduced into the filter shell or by way of any other route which permits the oil to avoid being forced through the filter paper. In conventional throw-away type oil filters, complex and expensive mechanisms are commonly resorted to for drainback prevention, which mechanisms must be positioned with great precision and require a variety of parts to accomplish their operation. These anti-drainback mechanisms are intended to permit the oil to flow in only one direction, viz., into the interior of the filter shell, thereby minimizing the drainback of unfiltered oil from within the filter shell to the engine.

However, in many instances, these mechanisms do permit the oil to be filtered to flow back to the engine without previously having been subjected to filtration.

The present invention solves these difficulties.

Accordingly, it is an object of this invention to provide an improved means for preventing drainback of unfiltered oil from an oil filter.

Another object of the invention is to provide an improved means for insuring filtration of oil introduced into an oil filter.

A further object of the invention is to provide a simplified means of preventing drainback of unfiltered oil from an oil filter which means requires a minimum of parts.

A further object of the invention is to provide such an anti-drainback means which does not require precision positioning within the filter.

A further object of the invention is to provide such an anti-drainback means which can be simply and easily manufactured and installed within an oil filter.

A further object of the invention is to provide an improved oil filter equipped with anti-drainback means of simple design and inherently long life.

Other and more specific objects of the present invention will be apparent from the following description as read in connection with the accompanying drawing.

In the drawing:

FIG. 1 is a side elevational view of an oil filter incorporating one form of the invention, portions of said oil filter being shown in cross-section;

FIG. 2 is an enlarged, fragmentary cross-sectional view of the lower portion of the form of the invention shown in FIG. 1, illustrating one operative position of the anti-drainback means employed in this form of the invention;

FIG. 3 is a perspective view of a sealing member employed for drainback prevention means in the aforesaid form of the invention.

As shown in the drawing, one form of the present invention comprises a cylindrical filter shell 10 permanently secured to an end closure 11 in the conventional manner, as by a suitable annular seam, generally designated by the numeral 12.

A filter cartridge comprising a pleated paper annulus 13 is disposed about a cylinder 14 having a plurality of apertures 15. The ends of the pleated paper annulus are received within cups 16, 17.

The upper cup 16 is maintained in yieldable contact with a spring member, generally designated by the numeral 35, comprising a plurality of inclined arms 35a extending radially from an upper central portion 35b in contact with the inner surface of the upper portion of the filter shell.

The cylinder 14 is also provided with a tubular member 19, having a bottom portion which supports a coil spring 20 abutting against disc 21. The disc is maintained in yieldable contact with the upper portion of said spring, said disc also covering an aperture 22 formed in the upper cup 16.

The lower cup 17 is also provided with a tubular member 17a having an annular lip 17b.

A rigid circular plate 23 is disposed adjacent to the end closure 11 and is secured in said position in any conventional manner as, for example, by an annular flange 24 extending into the seam 12. The plate is provided with an internally threaded central aperture 25 and a plurality of apertures 26 surrounding said central aperture 25.

An important feature of the invention resides in the use of a seal 27, such as, for example is depicted in FIGS 2 and 3. This seal may be composed of any soft, resilient material such as a yieldable, resilient polyurethane. Other yieldable, resilient materials may also be employed.

The seal 27 is formed of a thick, cushion-like layer of such material and is maintained in springable contact with the lower cup 17. A centrally formed aperture 18 is formed in the seal.

With the foregoing arrangement, the filter may be operated to permit the introduction of oil under pressure, its filtration through the pleated annulus and return in a filtered state to the lubricating system of the engine.

Thus, the internal threads of the aperture 25 may be engaged with the oil lubricating system of an engine in the conventional manner, as by a suitably threaded nipple mounted on the engine block and communicating with said system. The apertures 26 may also be brought into communication with said system in any conventional manner, the flow of oil to said apertures 26 from said system being sealed against leakage by a suitable gasket 28 secured by a reversely bent flange 29 which defines an aperature 30 formed in the end closure, the gasket 28 being seatable upon a suitable surface presented by the engine block.

In operation, oil to be filtered is introduced from the oil system of the engine and into the apertures 26. Since the oil is under pressure, it is urged against the lower surface of the seal 27 which is compressed and lifted to the position depicted in FIG. 2, thereby permitting the said oil to flow through the apertures 26, in the direction of the arrows shown in said last-mentioned figure, to the outer surface of the pleated annulus and thence therethrough into the cylinder 14 by way of the apertures 15. The oil thus filtered may then flow back into the engine oil system by way of the threaded aperture 25.

The seal 27 is maintained in yieldable contact with plate 23 and the lower cup 17. It is to be noted that said seal need not be positioned on the tubular member defining the internally threaded central aperture 25 and that it is sufficient for proper operation of the invention if said seal covers the apertures 26 in the manner shown in FIG. 2.

When the engine is not in operation, the seal, by virtue of its resilience, assumes the position depicted in FIG. 1, wherein it blocks any drainback of oil from the annular space surrounding the pleated annulus, i.e., the seal assumes a position whereby it covers the apertures 26. It is also to be noted that at all times during operation of the filter, the upper surface of the seal maintains contact with the lower surface of the cup 17. With this arrangement, a seal is constantly maintained against the flow of oil between the upper surface of the seal and the lower surface of the cup 17 and thence into the central aperture 25, thereby preventing the short-circuiting of the desired oil flow. Thus, the possibility of introducing unfiltered oil back into the engine oil system during the useful life of the filter is eliminated.

Flow between the lower surface of the seal and the upper surface of the plate 23 inwardly towards said aperture 25 is also prevented since the seal is maintained in constant contact with the upper surface of said plate by reason of the fact that the distance between the inner edge 26a of said aperture to the edge 18a of the aperture 18 in said seal 27 is relatively great as compared with the distance between the outer edge 26b of apertures 26 to the outer edge 18b of said seal. Thus, when the seal is compressed by the oil pressure exerted through the apertures 26 it will lift the seal so as to permit the oil to escape in a direction radically outward of said seal as shown in FIG. 2.

As in conventional filters, when the filter paper becomes clogged so that its useful life is at an end, the oil introduced through the apertures will flow to the annular space surrounding the filter paper and thence to the upper portion of the filter shell where the pressure of the oil will depress the disc 21, so as to permit the oil to enter the tubular member 19, and return to the engine lubricating system by way of the cylinder 14 and central aperture 25. At this time, of course, the useful life of the filter having ended, it may be unscrewed from the previously mentioned nipple of the engine block and discarded in favor of replacement by a new filter.

By virtue of the foregoing arrangement, it will be seen that the present invention accomplishes its purpose in a simple, ingenious and economical manner.

The embodiment of the invention illustrated and described hereinabove hase been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:

An improved replaceable oil filter comprising, in combination:
 (a) a filter shell;
 (b) an end closure sealed to said filter shell;
   (i) said end closure being provided with an axial aperture;
 (c) a filter cartridge within said filter shell;
 (d) said filter cartridge including
   (i) a perforated tube;
   (ii) upper and lower cups abutting against the ends of said perforated tube;
   (iii) said upper cup being provided with an aperture;
   (iv) said lower cup being provided with a sleeve extending axially thereof;
   (v) one end of said sleeve being provided with an annular lip;
   (vi) said annular lip defining an aperture in said lower cup;
   (vii) said aperture communicating with the interior of said perforated tube;
   (viii) a pleated paper annulus being seated within said upper and lower cups and disposed annularly of said perforated tube;
 (e) said filter cartridge being supported at its upper end by springable means abutting against the upper cup and the inner surface of said filter shell;
 (f) a rigid plate disposed inwardly of said end closure and adjacent thereto;
   (i) said rigid plate being formed integrally with a tubular element extending axially of said rigid plate.
   (ii) said tubular element defining an aperture disposed centrally in said rigid plate;
   (iii) said rigid plate being provided with a plurality of apertures surrounding said centrally disposed aperture;
   (iv) said plurality of apertures and centrally disposed aperture communicating with the axial aperture in said end closure;
 (g) a resilient plate disposed between said rigid plate and said lower cup;
   (i) the upper and lower surfaces of said resilient plate being in continuous contact with the lower surface of said lower cup and the upper surface of said rigid plate respectively;
   (ii) the lower surface of said resilient plate yieldably covering said purality of apertures provided in said rigid plate and providing a channel for communication between them and the outer periphery of said pleated paper annulus when said lower surface of said resilient plate is subjected to fluid pressure exerted through said plurality of apertures provided in said rigid plate;
   (iii) said resilient plate being compressible by said fluid pressure to uncover said plurality of apertures in said rigid plate, whereby fluid flow through said plurality of apertures and said pleated paper annulus and into said perforated tube and said aperture in said lower cup may be established to permit filtration of said fluid and discharge thereof from said filter through the aperture disposed centrally in said rigid plate and said axial aperture provided in said end closure;
   (iv) said tubular element being received within said sleeve and being abuttable against said annular lip;
(h) said perforated tube also being provided with means for by-passing said fluid flow through said pleated paper annulus when it becomes clogged;
(j) said by-passing means communicating with the aperture provided in said upper cup and with said perforated tube.

References Cited by the Examiner

UNITED STATES PATENTS

| | | |
|---|---|---|
| 661,603 | 11/00 | Gold. |
| 2,106,638 | 1/38 | Hillier. |
| 2,731,154 | 1/56 | Burnell _____ 210—130 |
| 2,877,902 | 3/59 | Chase et al. _____ 210—440 |
| 2,888,141 | 5/59 | Coates et al. _____ 210—136 X |
| 3,083,832 | 4/63 | Hatheway et al. |

REUBEN FRIEDMAN, *Primary Examiner.*

HERBERT L. MARTIN, *Examiner.*